(12) United States Patent
Healy

(10) Patent No.: US 9,243,567 B2
(45) Date of Patent: Jan. 26, 2016

(54) SYSTEM AND METHOD TO CONTROL A GAS TURBINE SUBJECT TO FUEL COMPOSITION VARIATION

(71) Applicant: General Electric Company, Schenectady, NY (US)

(72) Inventor: Timothy Andrew Healy, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 464 days.

(21) Appl. No.: 13/685,958

(22) Filed: Nov. 27, 2012

(65) Prior Publication Data

US 2014/0144153 A1    May 29, 2014

(51) Int. Cl.
| | | |
|---|---|---|
| *F02C 9/40* | (2006.01) | |
| *F02C 7/22* | (2006.01) | |
| *F02C 9/28* | (2006.01) | |
| *F02C 7/224* | (2006.01) | |
| *F02C 7/228* | (2006.01) | |

(52) U.S. Cl.
CPC . *F02C 9/40* (2013.01); *F02C 7/224* (2013.01); *F02C 7/228* (2013.01); *F02C 9/28* (2013.01)

(58) Field of Classification Search
CPC ............... F23R 3/28; F02C 9/26; F02C 9/28; F02C 9/40; F02C 7/224; F02C 7/228; F02D 19/02–19/06
See application file for complete search history.

(56) References Cited

U.S. PATENT DOCUMENTS

| | | | |
|---|---|---|---|
| 6,082,092 A | 7/2000 | Vandervort | |
| 7,127,898 B2 | 10/2006 | Healy | |
| 7,565,805 B2 | 7/2009 | Steber et al. | |
| 7,854,110 B2 | 12/2010 | LaGrow et al. | |
| 7,966,802 B2 * | 6/2011 | Szepek et al. | 60/39.281 |
| 8,731,797 B2 * | 5/2014 | Demougeot et al. | 701/100 |
| 2005/0107941 A1 | 5/2005 | Healy | |
| 2005/0114010 A1 | 5/2005 | Healy et al. | |
| 2010/0275609 A1 | 11/2010 | Snider | |
| 2012/0023953 A1 | 2/2012 | Thomas et al. | |

* cited by examiner

*Primary Examiner* — Phutthiwat Wongwian
*Assistant Examiner* — Rene Ford
(74) *Attorney, Agent, or Firm* — Hoffman Warnick LLC; Ernest G. Cusick

(57) ABSTRACT

A system and method control a gas turbine subject to fuel composition variation. The method includes operating a first effector to control the gas turbine based on fuel composition. The method also includes operating a second effector to maintain operation of the first effector within a first boundary limit, the second effector operation being initiated when the operating the first effector reaches a second boundary limit within the first boundary limit.

17 Claims, 5 Drawing Sheets

SYSTEM AND METHOD TO CONTROL A GAS TURBINE SUBJECT TO FUEL COMPOSITION VARIATION

BACKGROUND OF THE INVENTION

The subject matter disclosed herein relates to gas turbine control and, more specifically, to control that accommodates changes in fuel composition.

The stability of power grid frequency requires that the power supplied to the grid equals the power demand from the grid. One of the factors that can cause variation in the power supplied to the grid by gas turbine engines is a change in the composition of the fuel supplied to the gas turbine. Composition variation of the natural gas supply is a common issue. Variation in fuel composition poses concerns for combustion dynamics, combustor blowout, emissions compliance (e.g., NOx, CO), auto-ignition, and flashback. Most premixed combustion systems are designed with sufficient auto-ignition and flashback margin to accommodate expected pipeline compositional variation. Thus, combustion dynamics, emissions compliance, and blowout remain the primary gas turbine operability concerns associated with fuel quality variation.

Most prior approaches to maintain acceptable combustor operability in the face of compositional variation in the fuel have proven costly and slow. For example, because combustor operability is acceptable within a defined range of the Modified Wobbe Index (MWI) [an extension of Wobbe Index (WI), which captures normalized energy output of a given gas, that includes fuel temperature], one approach involves compensating for changes in gas composition with changes in fuel temperature to maintain a constant MWI. This approach involves closed-loop control of MWI by varying the temperature set-point of a gas fuel heater. However, the approach is costly, because it requires a Wobbe meter and/or gas chromatograph, and slow because of the time constant typically associated with heating and cooling large amounts of natural gas.

One form of gas turbine control that is fast enough to accommodate rapid variations in fuel composition involves distribution of the fuel supply among the multiple nozzles of a combustor in a method referred to as combustor fuel staging or fuel split scheduling. When controlled with a model-based algorithm, fuel splits have proven to be a fast effector that accommodates rapid changes in fuel composition. While extremely effective when authority is available, the fuel split control is subject to limits beyond which it is ineffective in maintaining stability. When fuel split is thus limited, it will be unable to accommodate additional rapid changes in fuel composition. Thus, the ability to accommodate rapid fuel variation across the widest possible range of fuels would be appreciated in the power industry.

BRIEF DESCRIPTION OF THE INVENTION

According to one aspect of the invention, a method to control a gas turbine subject to fuel composition variation includes operating a first effector to control the gas turbine based on fuel composition; and operating a second effector to maintain operation of the first effector within a first boundary limit, the operating the second effector being initiated when the operating the first effector reaches a second boundary limit within the first boundary limit.

According to another aspect of the invention, a system to control a gas turbine subject to fuel composition variation includes a first effector configured to control the gas turbine based on the fuel composition variation, the first effector maintaining authority to control the gas turbine up to a first boundary limit; and a second effector configured to maintain the first effector within the first boundary limit, the second effector being operational when the first effector has reached a second boundary limit within the first boundary limit.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As noted above, model-based fuel staging or fuel split control may accommodate rapid variations in fuel composition. However, fuel splits have boundaries that limit their authority. These boundaries (upper and lower limits beyond which the fuel split controller does not have authority to control) are caused in part by the compromises needed to control various parameters such as, for example, NOx emissions, PK1 and PK2 combustion dynamics, and lean blowout (LBO). The split schedule is defined off-line and tuned in-line. To say that the fuel split controller has reached its limits of authority is to say that a physical or parameter boundary limit has been reached at which the fuel split controller can no longer adjust fuel distribution to maintain all the required parameters within acceptable values. An effector at the limit of its authority is said to be saturated. An example of the fuel split effector saturation involves the physical limits of the gas control valves used to adjust the fuel splits to each injector. As another example, when saturated, the fuel split effector cannot simultaneously maintain both NOx emissions and dynamics at acceptable levels.

With saturated split effectors, further fuel variation could be accommodated by a fuel temperature controller, which adjusts the fuel temperature set-point to perform close-loop control on combustion dynamics and/or emissions. This approach would certainly increase the allowable variation in fuel quality. In addition, because both controls (fuel split and fuel temperature) are based on emissions and dynamics and not on the Wobbe Index or Modified Wobbe Index (MWI), a costly Wobbe meter or gas chromatograph is not needed. However, because the thermal inertia of the fuel heater limits the speed with which the fuel temperature control system could react to variations in fuel composition, the fuel temperature control represents a slow effector and does not evidence a similar ability to accommodate rapid changes in fuel composition as the fuel split controller.

In light of the above, embodiments of a gas turbine controller detailed herein employ the fast effector (fuel split control), not in parallel with fuel temperature control, but, instead, with the lower-bandwidth fuel temperature effector maintaining close-loop control of the fuel split margin to a limiting boundary. That is, the relatively slower effector (fuel temperature control) is used to maintain enough margin (with amount of margin determined as detailed below) to allow the fast effector (fuel split control) to maintain control authority and to accommodate rapid changes in fuel composition over an increased range of fuel quality variation.

Figure 1:
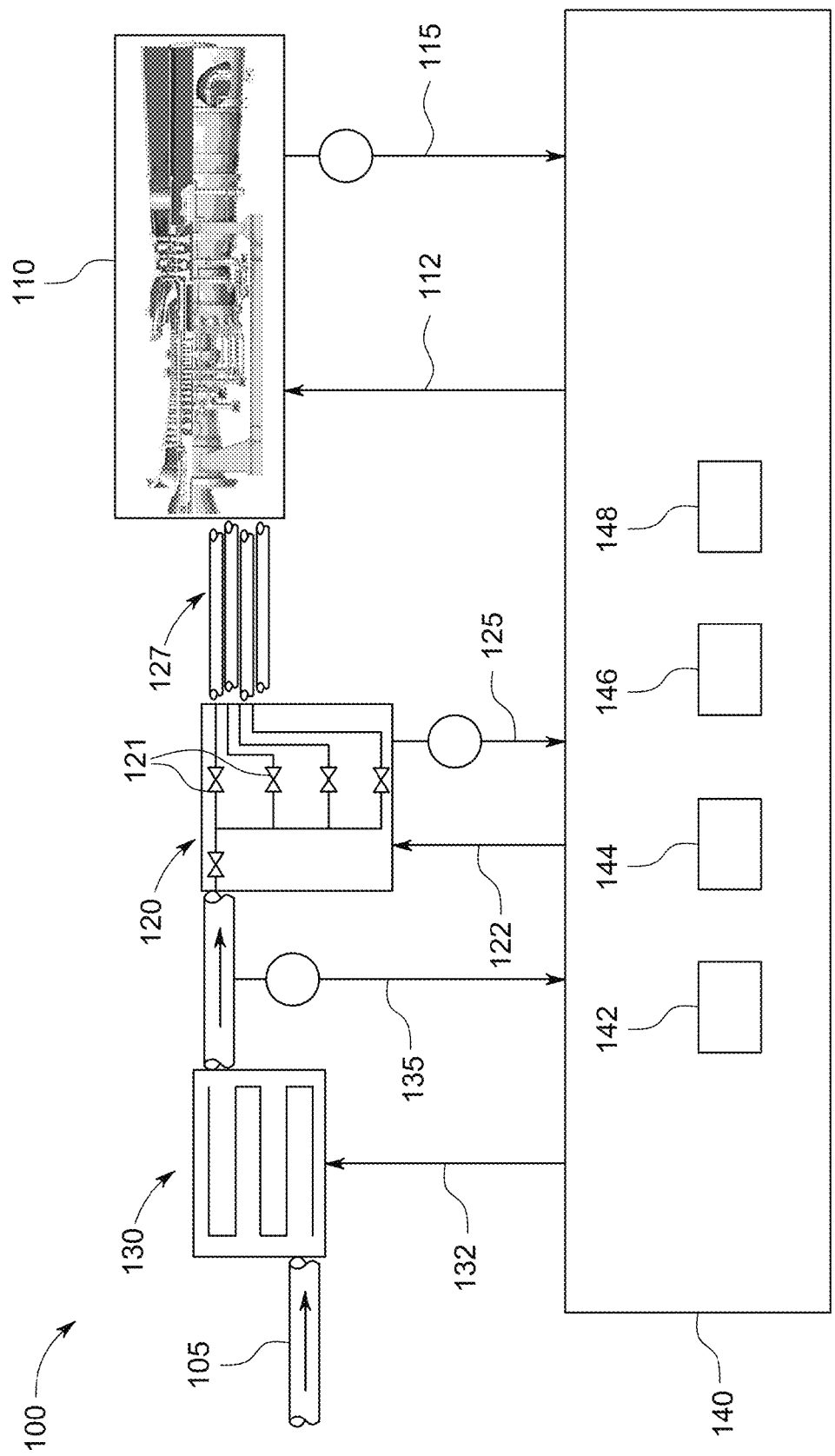
FIG. 1 is a block diagram of the gas turbine control system according to an embodiment of the invention.

FIG. 1 is a block diagram of the gas turbine control system 100 according to an embodiment of the invention. The gas turbine control system 100 includes a controller 140 which may comprise one or more processors 142 and memory devices 144. The controller 140 may also include a user interface 146 to facilitate user interaction with the control of the gas turbine 110 and an output device 148 that may include a display device. While a single controller 140 is shown interacting with the various modules of the gas turbine control system 100, in alternate embodiments, each of the modules (e.g., fuel temperature module 130) may be coupled to a different controller 140 which may be in communication with other controllers 140. The gas fuel 105 supplies the gas turbine 110 through the fuel input 127. As FIG. 1 shows, two modules—the fuel temperature module 130 and the fuel split module 120—are in the path of the fuel 105 that is supplied to the gas turbine 110. The fuel split module 120 may be regarded as the primary controller accounting for fuel 105 composition variation, because the fuel split module 120 is able to react quickly to rapid changes in fuel 105 composition. The fuel split module 120, which is detailed further below, uses a fuel split effector signal 122 from the controller 140 and supplies fuel system sensor data 125 to the controller 140. The fuel split module 120 includes various valves 121 to control the fuel input 127. The fuel temperature module 130, which is also detailed further below, keeps the fuel split module 120 operating within an established boundary limit. That is, rather than control fuel 105 temperature to achieve a particular MWI, the temperature module 130, which includes a heater, controls fuel temperature, as needed, to facilitate the fuel split module 120 maintaining its authority. The fuel temperature module 130 uses a fuel temperature set-point signal 132 from the controller 140 and supplies a fuel temperature measurement 135 to the controller 140. The gas turbine 110 has additional controls in the form of gas turbine effectors 112 and supplies gas turbine sensor data 115 to the controller 140.

Figure 2:
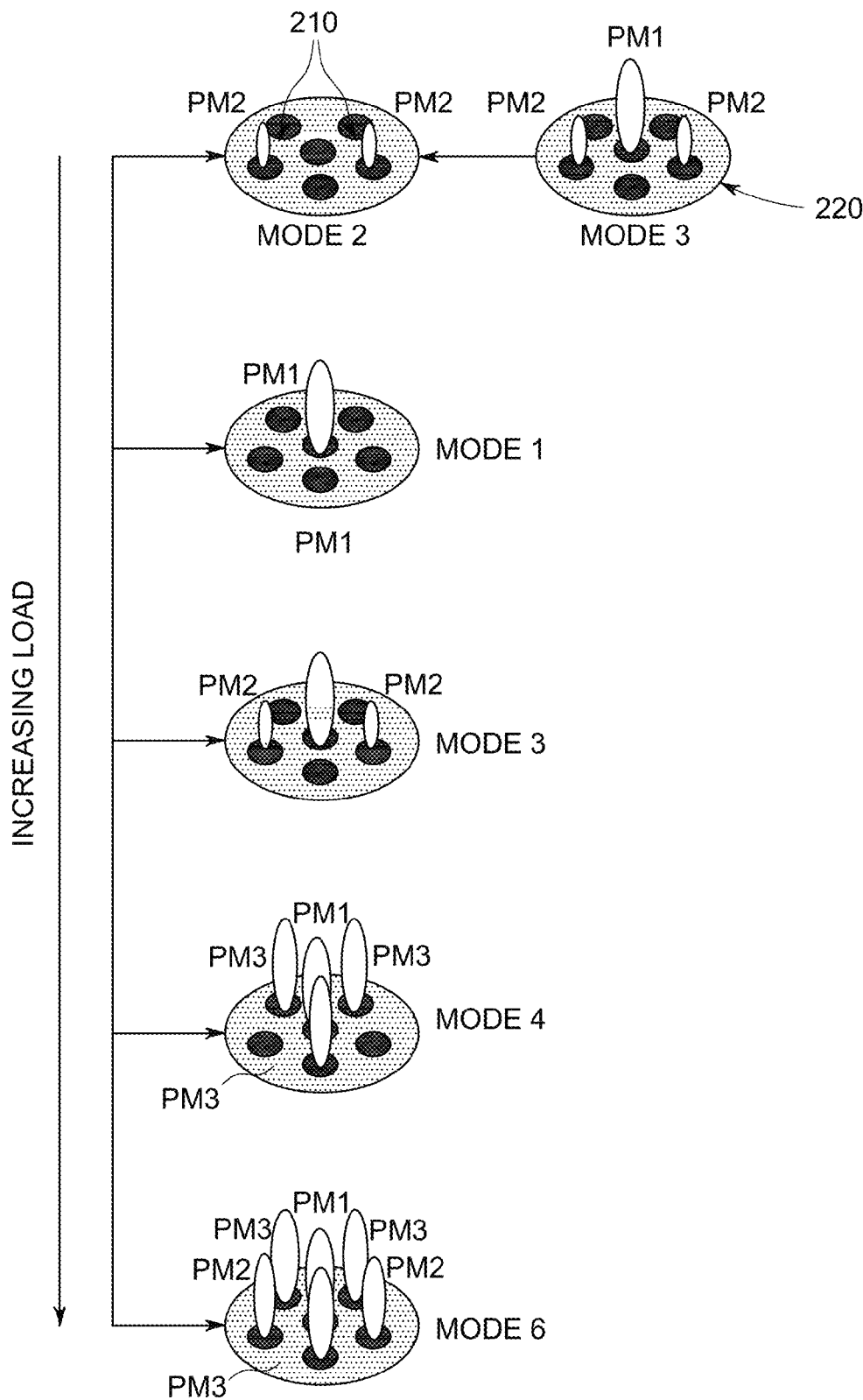
FIG. 2 is an explanatory illustration of fuel splits according to the fuel split module of the gas turbine control system shown in FIG. 1; . . .

FIG. 2 is an explanatory illustration of fuel splits according to the fuel split module 120 of the gas turbine control system 100 shown in FIG. 1. The fuel split module 120 operates according to a model-based control processed by the processor 142. As previously noted, the gas turbine 110 must match the load in order to maintain frequency stability. The fuel split module 120 maintains combustor operability for varying loads on the gas turbine 110 by changing the distribution of incoming fuel 105 mixed with air or pre-mix (PM) directed to each fuel injector 210 of each of the multiple cans 220 of the gas turbine 110. The algorithm that controls this fuel 105 distribution or fuel split is model-based. The model processed by the controller 140 uses information from the gas turbine sensor data 115 and the fuel system sensor data 125 and generates a fuel split effector signal 122 that the fuel split module 120 uses to control various valves to affect the fuel split at the fuel input 127. The model-based algorithm may lose authority to continue control of the gas turbine 110 with the fuel split module 120 when a boundary limit is reached. For example, if fuel 105 composition changes rapidly when the valves 121 of the fuel split module 120 are in a given position, that physical state of the valves 121 may prevent further control of the fuel splits to handle the change in fuel 105 composition. As another example, the fuel split module 120 may approach a boundary limit because, beyond a certain set of conditions for the gas turbine 110, the fuel split module 120 cannot respond to a fuel 105 composition variation to maintain both dynamics and NOx emissions at acceptable levels. The model processed by the controller 140 can determine the boundary limits of authority of the fuel split module 120.

Figure 3:
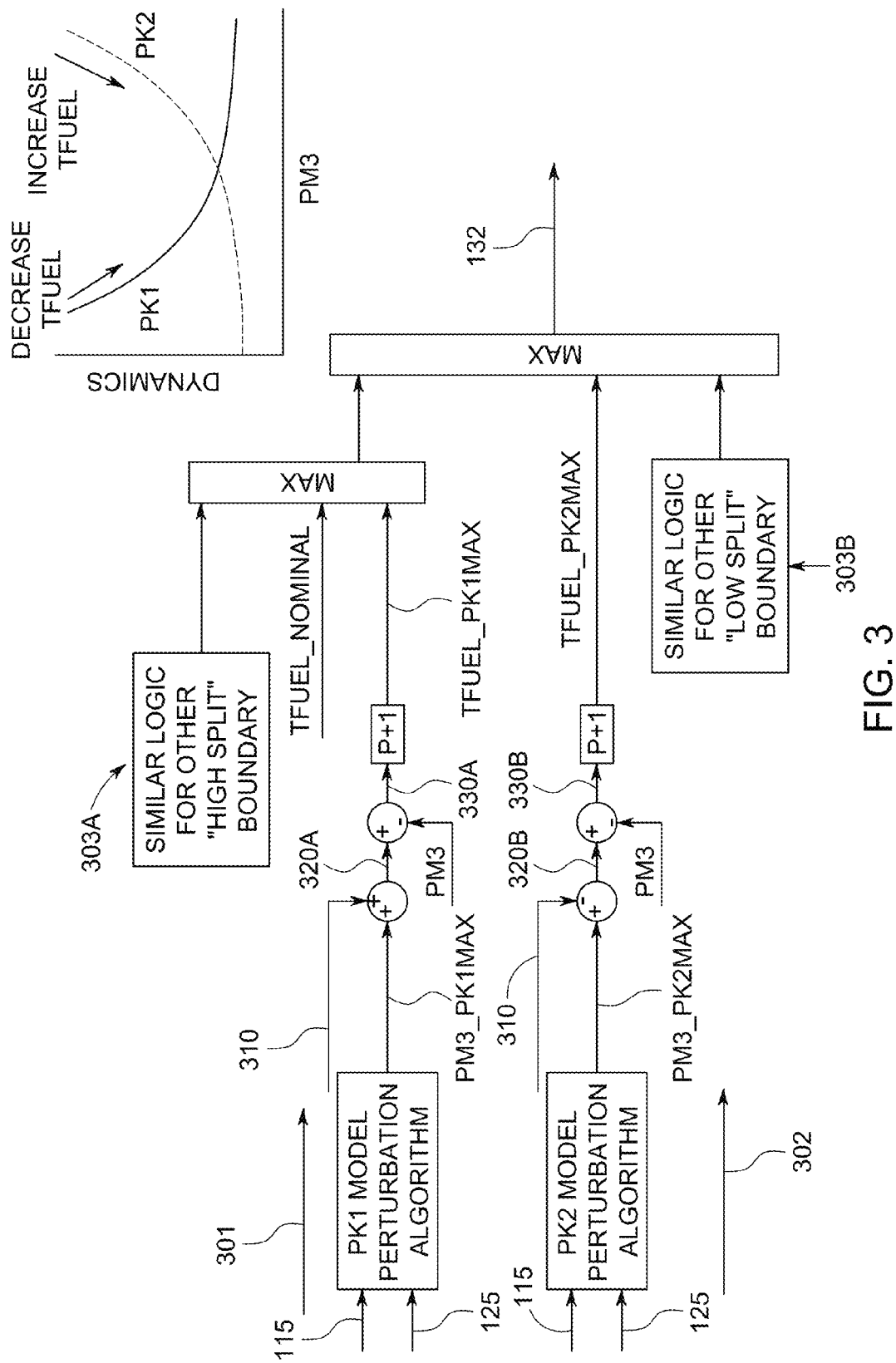
FIG. 3 is an explanatory illustration of a determination of the fuel temperature set-point signal used by the fuel heater module of the gas turbine control system shown in FIG. 1.

FIG. 3 is an explanatory illustration of a determination of the fuel temperature set-point signal 132 used by the fuel temperature module 130 of the gas turbine control system 100 shown in FIG. 1. Only the PM3 split (shown in Mode 4 and Mode 6 of FIG. 2) is considered for explanatory purposes, but it should be understood that the discussion below applies to each split affected by the fuel split module 120. The determination of the fuel temperature set-point signal 132, discussed below, is part of the processing done by the controller 140. As noted above, fuel 105 temperature control is used by the fuel temperature module 130 to keep the fuel split module 120 within its boundary limits of authority. That is, the fuel split module 120 provides high-bandwidth control to rapidly modify fuel splits, as needed, based on fuel 105 composition variations, and the fuel temperature module 130 provides low-bandwidth control in affecting gas turbine 110 conditions such that the fuel split module 120 authority stays within an acceptable margin of its authority boundary limit. The fuel temperature module 130 provides closed-loop control on the fuel split module 120 authority as detailed below.

The premise used to implement the logic used to determine the fuel temperature set-point signal 132 is shown at the upper right of FIG. 3. Specifically, two exemplary frequencies of combustion dynamics (PK1 and PK2) are considered and are shown to have the opposite PM3/dynamics relationships. That is, to reduce dynamics for the PK1 case, PM3 must be increased, and to reduce dynamics for the PK2 case, PM3 must be decreased. Keeping that in mind, the logic used to determine the fuel temperature set-point signal 132 in the example is detailed. In path 301, gas turbine sensor data 115 and fuel system sensor data 125 are input to the PK1 Model Perturbation Algorithm, which outputs the boundary limit of authority (PM3_PK1max). Because in the PK1 case, PM3 must be increased to reduce dynamics, the desired buffer 310 of authority is added to output the desired PM3 320a. For example, if the PK1 Model Perturbation Algorithm outputs 63.2% PM3 and the buffer 310 is 1% PM3, then the desired PM3 320a is the aggregate of those two values or 64.2 PM3. The actual PM3 is subtracted from that desired PM3 320a value to give the error 330a. The proportional and integral (P+I) computer control is used to determine the Tfuel_PK1max or fuel temperature needed to make the error 330a equal to 0 or, in other words, to have the desired PM3 320a match the actual PM3. The recursive nature of the control system implemented by the processor 140 is used to integrate the control over time. In path 302, the logic is similar to that discussed for path 301. However, because PM3 must be decreased to reduce dynamics for the PK2 case, the buffer 310 is subtracted from the PM3_PK2max (limit of authority in the PK2 case) to provide the desired PM3 320b. It is important to note that, in a similar way to paths 301 and 302, other logic paths 303 are used to determine the fuel temperature needed to protect other factors (e.g., NOx). A priority is used by the controller 140 to determine the fuel temperature set-point signal 132 based on the different outcomes of the different factors (paths 301, 302, 303). It also bears noting again that the exemplary processor logic shown in FIG. 3 only addresses one of the splits (PM3 in this case), but a similar procedure is followed for the other splits, as well.

The amount of buffer 310 provided by the fuel temperature module 130 (i.e., how close the fuel split module 120 is permitted to get to its boundary limit) may be user determined. The determination of the buffer 310 may be based on, for example, a desire to accommodate a certain level of fuel 105 composition variation or a certain percentage of MWI. Once the level of fluctuation to be tolerated is determined, the controller 140 may run scenarios in the model to determine when the fuel split module 120 will run out of authority according to the scenarios.

Figure 4:
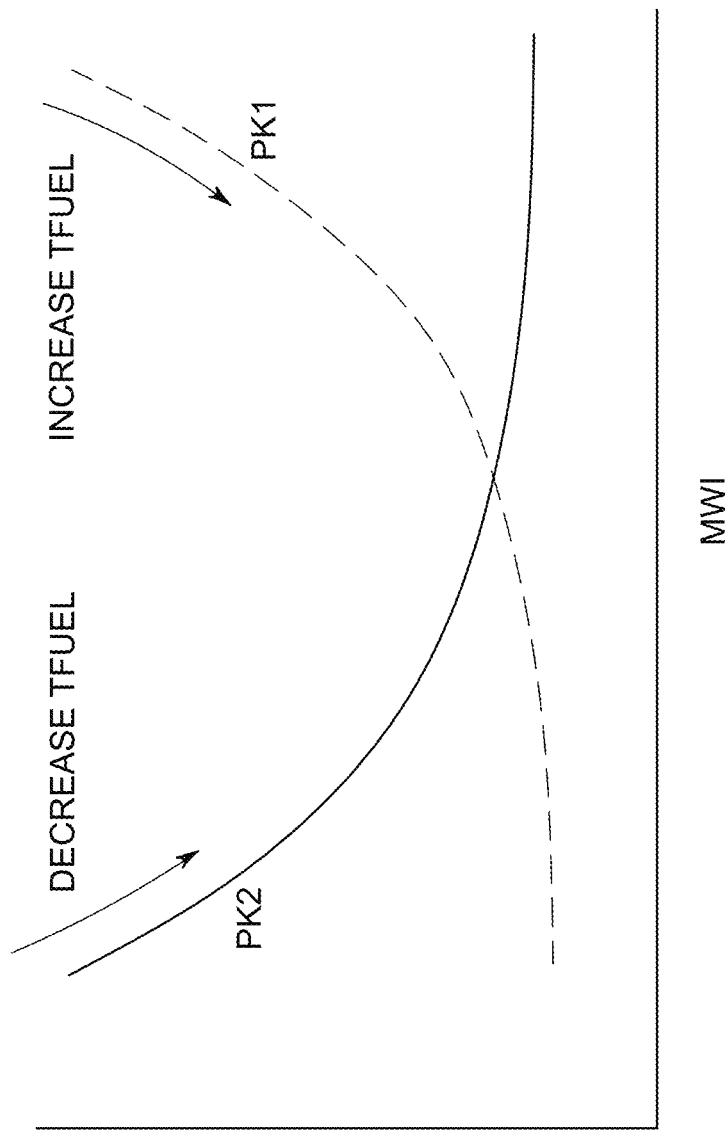
FIG. 4 illustrates two exemplary characteristics of combustion dynamics tones (frequencies) of the gas turbine combustion system.

FIG. 4 illustrates two exemplary frequencies of combustion dynamics, PK1 and PK2, of the gas turbine 110. This illustration, like the one included in FIG. 3, clarifies the direction of control of fuel temperature needed to keep the fuel split module 120 in authority, as detailed below. The relationship between MWI (fuel composition) and dynamics is shown for each of PK1 and PK2. Specifically, in the case of PK1, cold fuel 105 is assumed and the dashed line indicates the relationship between MWI (which is affected by fuel composition and fuel temperature) and dynamics. In the PK1 case, when the determined buffer 310 of the fuel split module 120 is reached, the fuel temperature module 130 must heat the fuel 105 to increase the fuel temperature (Tfuel) in order to reduce dynamics and keep the fuel split module 120 in authority. In the case of PK2, heated fuel 105 is assumed and the solid line indicates the relationship between MWI and dynamics. In the PK2 case, when the determined buffer 310 of the fuel split module 120 is reached, the fuel temperature module 130 must reduce Tfuel (allow the fuel 105 to cool) in order to reduce dynamics and keep the fuel split module 120 in authority. FIG. 3 focuses on PM3 (fuel injector 210 associated with pre-mix 3) shown in modes 4 and 6 at FIG. 2.

Figure 5:
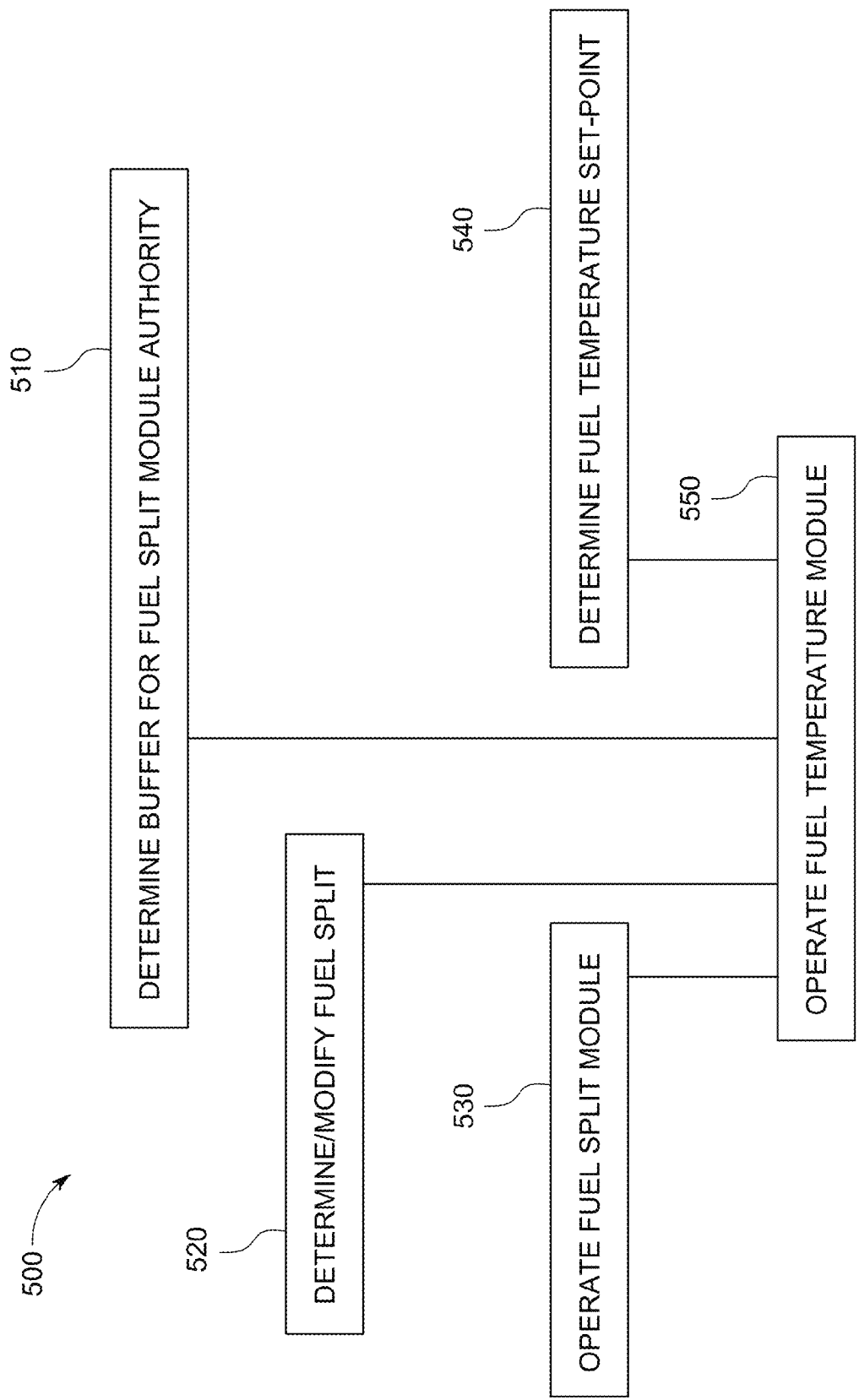
FIG. 5 depicts processes involved in gas turbine control according to embodiments of the invention.

FIG. 5 depicts processes 500 involved in gas turbine control according to embodiments of the invention. At block 510, determining a buffer 310 for the fuel split module 120 authority may include user input. As noted with reference to FIG. 3, a system operator may determine the amount of fluctuation that the fuel split module 120 must accommodate and use the models processed by the controller 140 to determine a buffer 310 based on that desired level of fluctuation capability. The processes 500 may include determining or modifying fuel splits (block 520) at the controller 140 to generate a fuel split effector signal 122 to the fuel split module 120. The fuel splits may be modified based on a change in composition of the fuel 105 supplied to the gas turbine 110. Operating the fuel split module 120, at block 530, may be thought of as operating a high-bandwidth effector to maintain gas turbine 110 stability in the face of changes (even rapid changes) in fuel 105 composition. However, when the fuel split module 120 reaches the buffer 310 of its boundary limit or authority limit, the processes 500 may include (block 540) determining a fuel temperature set-point and outputting the fuel temperature set-point signal 132 at the controller 140. At block 550, operating the fuel temperature module 130 to control the fuel 105 to the fuel temperature set-point affects (increases) gas turbine 110 stability such that the fuel split module 120 is maintained within the desired buffer 310 of its authority limit.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method to control a gas turbine subject to fuel composition variation, the method comprising:
   executing, using a processor, a system controller to determine a buffer range of split ratios, the buffer range being a difference between a threshold split ratio and a split ratio at a physical limit of at least one gas control valve;
   calculating a target split ratio of the at least one gas control based on a fuel composition of a fuel within the gas turbine;
   in response to the target split ratio being outside the buffer range, adjusting the at least one gas control valve with the system controller to yield the target split ratio; and
   in response to the target split ratio being within the buffer range, further executing the system controller to perform actions including:
      determining a temperature set-point of the fuel within the gas control valve,
      heating the fuel to the temperature set-point,
      recalculating the target split ratio of the at least one gas control valve based on the fuel composition and the temperature set-point, and
      adjusting the at least one gas control valve to yield the recalculated target split ratio.

2. The method according to claim 1, wherein the adjusting of the at least one fuel valve includes distributing the fuel entering the gas turbine to two or more fuel injectors.

3. The method according to claim 2, wherein the executing of the system controller includes executing a fuel distribution model based on sensor input and outputting a control signal to a fuel split controller to adjust the at least one fuel valve.

4. The method according to claim 1, wherein the heating of the fuel to the temperature set-point includes outputting a control signal from the system controller to a fuel temperature controller to adjust an amount of heating delivered to the fuel.

5. The method according to claim 1, wherein the determining of the buffer range includes selecting a tolerance amount of a parameter to be accommodated during the operation of the gas turbine.

6. The method according to claim 5, wherein the tolerance amount of the parameter is a percentage of change in modified Wobbe index (MWI) of fuel.

7. The method according to claim 6, wherein the tolerance amount of the parameter is an amount of change in fuel quality.

8. A system to control a gas turbine subject to fuel composition variation, the system comprising:
   a system controller configured to control the gas turbine based on the fuel composition variation, the fuel split controller maintaining authority to control the gas turbine by performing actions including:
      determining a buffer range of split ratios, the buffer range being a difference between a threshold split ratio and a split ratio at a physical limit of at least one gas control valve, calculating a target split ratio of the at least one gas control valve based on a fuel composition of a fuel within the gas turbine, in response to the target split ratio being outside the buffer range, outputting a first split control signal to adjust the at least one gas control valve with the system controller to yield the target split ratio, and in response to the target split ratio being within the buffer range, further performing actions including:

determining a temperature set-point of the fuel within the gas control valve, outputting a temperature control signal to heat the fuel to the temperature set-point, recalculating the target split ratio of the at least one gas control valve based on the fuel composition and the temperature set-point, and outputting a second split control signal to adjust the at least one gas control valve to yield the recalculated target split ratio;

a fuel temperature controller configured to adjust the temperature fuel within the gas turbine based on the temperature control signal from the system controller; and a fuel split controller configured to adjust the at least one gas control valve based on the first and second split control signals from the system controller.

9. The system according to claim 8, wherein the fuel split controller is configured to distribute fuel entering the gas turbine to two or more fuel injectors.

10. The system according to claim 9 wherein the fuel split controller is a model-based controller.

11. The system according to claim 8, wherein the fuel temperature controller includes a heater.

12. The system according to claim 8, wherein the fuel temperature controller controls the temperature of the fuel to increase a difference between the recalculated target split ratio and the buffer range.

13. The system according to claim 8, wherein the system controller executes a model to determine the buffer.

14. The system according to claim 8, wherein the system controller determines the buffer range based on the physical limits and a user input.

15. The system according to claim 14, wherein the user input indicates a desired tolerance amount of a parameter to be accommodated by the gas turbine.

16. The system according to claim 15, wherein the tolerance amount of the parameter is a percentage of change in modified Wobbe index (MWI) of fuel.

17. The system according to claim 15, wherein the tolerance amount of the parameter is an amount of change in fuel quality.

* * * * *